Patented Jan. 29, 1946

2,393,716

UNITED STATES PATENT OFFICE 2,393,716

COMPOSITIONS CONTAINING ACTIVE CHLORINE

Earl W. Smith, Syracuse, N. Y., assignor to The Solvay Process Company, New York, N. Y., a corporation of New York No Drawing. Application May 19, 1942, Serial No. 443,671

18 Claims. (Cl. 167—22)

This invention relates to new compositions containing active chlorine which are suitable for use as germicides, bleaches and for other purposes for which a material containing active chlorine is suited. The invention further relates to a method for the preparation of a chlorosulfonamide germicide and bleach in a marketable form and for increasing the activity of a chlorosulfonamide when used as a germicide or bleach or for like purposes.

It is known that Chloramine-T (hydrated sodium tolyl-N-chlorosulfonamide) contains active chlorine and has germicidal properties when used in solution in water. For example, it has been suggested to add Chloramine-T to water to sterilize the water. It has also been proposed to acidify the water in order to increase the bactericidal activity of the Chloramine-T. It is desirable to supply to users of germicides and chlorinating agents the materials in a form in which, when dissolved in water, they give a solution of high activity. Accordingly, attempts were made to prepare solid mixtures of Chloramine-T and acids such as tartaric or citric acid which, when dissolved in water, would give an acidified solution of the Chloramine-T of high activity. It was impracticable, however, to prepare and market such mixtures. Mixtures of solid Chloramine-T and acids are unstable. The Chloramine-T relatively rapidly decomposes in the presence of an acid and loses its effectiveness as a germicide or chlorinating agent. Prior to my invention, therefore, it was considered N-chlorosulfonamides were incompatible with and decomposed by all acids or substances of an acid nature.

I have now discovered that certain aromatic N-chlorosulfonamides may be mixed with certain acidic materials to give solid mixtures which are stable during long periods of time. When these solid mixtures are dissolved in water to give solutions containing bacteria-killing concentrations of the N-chlorosulfonamide, the acidic materials render the N-chlorosulfonamide particularly active as a germicide and chlorinating agent.

The compositions of my invention comprise mixtures of certain aromatic N-chlorosulfonamides with a soluble, acidic, acid salt of a polybasic acid which, in water solution containing about 0.25 gram per liter of the acid salt, gives a solution with a pH of 6 or lower.

While it would appear the action of these acid salts in rendering the N-chlorosulfonamide in solution highly active as a germicide and chlorinating agent is closely connected with the acidic nature of the salt, it would appear the increased activity of the N-chlorosulfonamide may not be due entirely to this characteristic of the salt. Accordingly, my invention is not limited to any particular theory as to why it appears important the salts both be acidic and be acid salts; i. e., contain ionizable hydrogen.

As the N-chlorosulfonamide component of the compositions of this invention any aromatic N-chlorosulfonamide may be employed the aromatic radical of which is no more electronegative than the phenyl radical ($C_6H_5$—). The art is familiar with various methods for determining the electronegativity of organic radicals whereby these radicals may be arranged in series according to decreasing electronegativity. These methods include:

(1) Splitting an unsymmetrical organomercuric compound with hydrogen chloride to yield a hydrocarbon and an organomercuric chloride:

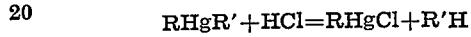

The radical cloven from the mercury atom is considered to be the more electronegative of the two.

(2) By determining the oxidation-reduction potentials of substituted paraquinones. The higher this potential is for the substituted paraquinone, the less is the electronegativity of the substituent radical.

(3) By measuring the rates of the following two reactions (a) and (b):

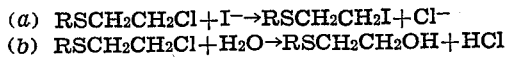

in which R represents various substituted phenyl radicals. For reaction (a) the higher the rate of reaction (the larger the numerical value for the constant K), the less is the electronegativity of the substituted phenyl radical. For reaction (b) the converse is true; i. e., the slower the rate of reaction (the smaller the numerical value for the constant K), the less is the electronegativity of the substituted phenyl radical.

(4) By introducing various substituents into one or both of the phenyl nuclei of diphenylchloromethane and measuring the rate of reaction of the chloro group with ethanol. The slower the rate of reaction (the smaller the numerical value for the constant K), the less is the electronegativity of the substituted phenyl radical.

By the above methods for determining the electronegativity of organic radicals, the tolyl radical, for example, is shown to be more electronegative than phenyl. Accordingly, my invention does not extend to tolyl N-chlorosulfonamide (Chloramine-T).

Although my invention is particularly important in connection with Chloramine-B (sodium phenyl-N-chlorosulfonamide.1½H₂O), due to its ease of preparation, high activity as a germicide and chlorinating agent and high stability in solid mixtures with acidic salts, the invention is not limited thereto. It comprises mixtures of acidic salts with other aromatic N-chlorosulfonamides in which the aromatic radical is no more electronegative than phenyl, such as the substituted phenyl-N-chlorosulfonamides in which the phenyl radical contains as substituents chlorine or the nitro group. Among such materials are the sodium chlorobenzene-N-chlorosulfonamides (e. g. sodium 2,5-dichlorobenzene-N-chlorosulfonamide.1½H₂O or sodium 4-chlorobenzene-N-chlorosulfonamide.1½H₂O) and the sodium nitrobenzene-N-chlorosulfonamides (e. g. sodium 3-nitrobenzene-N-chlorosulfonamide). The N-chlorosulfonamides are used in the form of their alkali metal salts, e. g. sodium or potassium N-chlorosulfonamides.

As the acidic salts mixed with the N-chlorosulfonamide, I prefer strongly acidic salts, i. e. salts which are sufficiently acidic that when the mixture is dissolved in water to give germicide-killing concentrations of the N-chlorosulfonamide, the acidic salt gives the solution a pH below 5.5. These strongly acidic salts give stable mixtures with the above-described N-chlorosulfonamides and are particularly effective to increase the activity of the N-chlorosulfonamides as germicides and chlorinating agents in solutions containing these salts. The following are suitable acidic salts for mixture with an N-chlorosulfonamide in accordance with my invention. These salts in aqueous solution containing 0.25 to 4 grams per liter of the salt, give solutions with pH values within the range of about 2.5 to 5.5.

Sodium bioxalate.H₂O
Sodium biadipate
Potassium bitartrate
Monosodium citrate
Sodium bimaleate.3H₂O
Sodium bimalate
Potassium biphthalate
Monosodium phosphate.H₂O
Sodium bisuccinate
Disodium citrate
Monopotassium phosphate
Sodium bimucate I prefer to employ the sodium or potassium salts of polybasic acids for addition to the N-chlorosulfonamides, but any salts not incompatible with the N-chlorosulfonamide may be used. Ammonium salts tend to decompose N-chlorosulfonamides, hence should not be mixed therewith. It is also obvious that no other materials such as are known to be incompatible with N-chlorosulfonamides should be included in the mixture. Thus, it is known that free acids and certain types of organic matter (including dirt, alcohol, sugar and glycerine), reducing agents generally, and salts of heavy metals (e. g. salts of iron, copper, manganese, nickel and cobalt), are incompatible with N-chlorosulfonamides. Hence, none of these materials should be included in the mixtures of this invention.

By mixing with the N-chlorosulfonamides one or more acidic salts as described above, a solid, stable germicide and bleach may be prepared in a marketable form which, when dissolved in water, gives solutions with pH 6 or lower, preferably below 5.5. In these solutions the N-chlorosulfonamide is particularly active as a germicide and chlorinating agent.

My invention will be further illustrated by the following examples of solid compositions within the scope of the invention:

*Example 1.*—2 parts by weight of Chloramine-B (sodium phenyl-N-chlorosulfonamide.1½H₂O), 5 parts by weight of solid, dry potassium bitartrate, and 20 parts by weight of dry sodium chloride are mixed. The Chloramine-B is a product purified by recrystallization from solution. The potassium bitartrate and sodium chloride are reagent grade materials. The sodium chloride is used as a diluent or filler for the mixture. All of the materials are mixed in the form of relatively fine powders or fine crystals to give a uniform mixture.

When the foregoing mixture was initially prepared it was found to contain 2.12% available chlorine. After storage for 25 months, the mixture analyzed 2.11% available chlorine. Water contaminated with *Staphlococcus aureus* was found to require the addition of 15 to 25 milligrams per liter of Chloramine-B to give a negative test for the presence of the *Staph. aureus* after ten minutes. When the water contained 0.5 gram per liter potassium bitartrate, a concentration of less than 1 milligram per liter of Chloramine-B gave a negative test for *Staph. aureus* after ten minutes. The two tests were carried out under comparable conditions and by the same procedure, thus showing the greatly increased bactericidal activity of Chloramine-B resulting from using it in a solution containing the potassium bitartrate.

If desired, in place of sodium chloride as a filler or diluent sodium sulfate or other neutral salts compatible with Chloramine-B may be used in the mixture of this example.

*Example 2.*—4 parts by weight sodium bimucate, 4 parts by weight hydrated Chloramine-B and 20 parts by weight sodium chloride as filler were mixed. The mixture thus prepared initially contained 4.18% available chlorine and, after storage for one year, was found to contain 4.17% available chlorine.

In making up the mixture of this example the sodium bimucate may be substituted by the same amount of any of the following materials: sodium bimaleate, sodium bisuccinate, sodium biadipate, sodium bioxalate, sodium bimalate, monosodium citrate, disodium citrate or potassium biphthalate. All of these acid salts give stable mixtures which, when dissolved in water, give solutions in which the N-chlorosulfonamide is highly active.

*Example 3.*—4 parts by weight of monohydrated monosodium phosphate, 4 parts by weight of hydrated Chloramine-B and 20 parts by weight of dry sodium chloride are intimately mixed. A mixture thus prepared initially contained 4.05% chlorine and, after storage for 180 days (six months), analyzed 4.06% available chlorine. Anhydrous monopotassium phosphate may be substituted for all or a part of the sodium phosphate of this example.

The proportions of acid salt to N-chlorosulfonamide may vary widely, depending upon the solvent in which the N-chlorosulfonamide is to be dissolved for use and the use to be made of the solution. In general, however, when the N-chlorosulfonamide is to be used as a germicide or disinfectant or for sterilizing water, it is preferred to employ about 1 part to 20 parts by weight of the acid salt to every 1 part of the N-chlorosulfonamide.

I claim:

1. As a new composition of matter containing active chlorine, a solid mixture containing an aromatic N-chlorosulfonamide in which the aromatic radical is no more electronegative than phenyl and an acidic salt compatible with said N-chlorosulfonamide and containing ionizable hydrogen.

2. As a new composition of matter containing active chlorine, a solid mixture comprising an aromatic N-chlorosulfonamide in which the aromatic radical is no more electronegative than phenyl and an acidic salt of an alkali metal which contains ionizable hydrogen and in aqueous solutions of a concentration of 0.25 gram per liter of the salt has a pH not above 6.

3. As a new composition of matter containing active chlorine, a solid mixture comprising an aromatic N-chlorosulfonamide in which the aromatic radical is no more electronegative than phenyl and a strongly acidic salt of an alkali metal which contains ionizable hydrogen, said salt being present in said solid mixture in amount sufficient to give an aqueous solution of said mixture containing a bacteria-killing concentration of said aromatic N-chlorosulfonamide, a pH below 5.5.

4. As a new composition of matter containing active chlorine, a solid mixture containing an aromatic N-chlorosulfonamide in which the aromatic radical is no more electronegative than phenyl and a mono-alkali metal phosphate.

5. As a new composition of matter containing active chlorine, a solid mixture containing an aromatic N-chlorosulfonamide in which the aromatic radical is no more electronegative than phenyl and mono-sodium citrate.

6. As a new composition of matter contaning active chlorine, a solid mixture containing an aromatic N-chlorosulfonamide in which the aromatic radical is no more electronegative than phenyl and potassium bitartrate.

7. As a new composition of matter containing active chlorine, a solid mixture comprising an aromatic N-chlorosulfonamide in which the aromatic radical is no more electronegative than phenyl and an acidic salt of an alkali metal which contains ionizable hydrogen and in aqueous solution of a concentration of 0.25 gram per liter of the salt has a pH not above 6, said mixture containing about 1 to 20 parts by weight of said acidic salt to every 1 part by weight of said N-chlorosulfonamide.

8. As a new composition of matter containing active chlorine, a solid mixture containing Chloramine-B and an acidic salt compatible with said N-chlorosulfonamide and containing ionizable hydrogen.

9. As a new composition of matter containing active chlorine, a solid mixture comprising Chloramine-B and an acidic salt of an alkali metal which contains ionizable hydrogen and in aqueous solutions of a concentration of 0.25 gram per liter of the salt has a pH not above 6.

10. As a new composition of matter containing active chlorine, a solid mixture comprising Chloramine-B and a strongly acidic salt of an alkali metal which contains ionizable hydrogen, said salt being present in said solid mixture in amount sufficient to give an aqueous solution of said mixture containing a bacteria-killing concentration of said Chloramine-B a pH below 5.5.

11. As a new composition of matter containing active chlorine, a solid mixture comprising Chloramine-B and an acidic salt of an alkali metal which contains ionizable hydrogen and in aqueous solution of a concentration of 0.25 gram per liter of the salt has a pH not above 6, said mixture containing about 1 to 20 parts by weight of said acidic salt to every 1 part by weight of said Chloramine-B.

12. As a new composition of matter containing active chlorine, a solid mixture containing Chloramine-B and a mono-alkali metal phosphate.

13. As a new composition of matter containing active chlorine, a solid mixture containing Chloramine-B and mono-sodium phosphate in the proportions of 1 to 20 parts by weight of mono-sodium phosphate to every 1 part by weight of said Chloramine-B.

14. As a new composition of matter containing active chlorine, a solid mixture containing Chloramine-B and mono-sodium citrate.

15. As a new composition of matter containing active chlorine, a solid mixture containing Chloramine-B and potassium bitartrate.

16. The method of preparing a highly active germicide and chlorinating agent which comprises mixing a solid aromatic N-chlorosulfonamide in which the aromatic radical is no more electronegative than phenyl with a solid acidic salt compatible with said N-chlorosulfonamide and which contains ionizable hydrogen and in aqueous solution of a concentration of 0.25 gram per liter of the salt has a pH not above 6.

17. As a new composition of matter containing active chlorine, a solid mixture containing an aromatic N-chlorosulfonamide in which the aromatic radical is no more electronegative than phenyl and an alkali metal bitartrate.

18. As a new composition of matter containing active chlorine, a solid mixture containing Chloramine-B and an alkali metal bitartrate.

EARL W. SMITH.